United States Patent
Lin

(10) Patent No.: US 10,831,285 B2
(45) Date of Patent: Nov. 10, 2020

(54) PEN-SHAPED FOLDING MOUSE

(71) Applicant: GIGA-BYTE TECHNOLOGY CO., LTD., New Taipei (TW)

(72) Inventor: Shih-Yuan Lin, Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/553,104

(22) Filed: Aug. 27, 2019

(65) Prior Publication Data

US 2020/0209983 A1     Jul. 2, 2020

(30) Foreign Application Priority Data

Dec. 28, 2018  (TW) .............................. 107147557 A

(51) Int. Cl.
*G06F 3/03*      (2006.01)
*G06F 3/0354*    (2013.01)

(52) U.S. Cl.
CPC .......... *G06F 3/0312* (2013.01); *G06F 3/0321* (2013.01); *G06F 3/03541* (2013.01); *G06F 3/03546* (2013.01)

(58) Field of Classification Search
CPC .. G06F 3/0312; G06F 3/0321; G06F 3/03541; G06F 3/03543; G06F 3/03545; G06F 3/03546
See application file for complete search history.

(56) References Cited

U.S. PATENT DOCUMENTS

| 7,733,326 B1 | 6/2010 | Adiseshan |
| 2008/0259033 A1* | 10/2008 | Mu ..................... G06F 3/03545 345/163 |
| 2013/0002547 A1 | 1/2013 | Cheng et al. |
| 2018/0224954 A1 | 8/2018 | Chiang et al. |

FOREIGN PATENT DOCUMENTS

| CN | 104199568 | 12/2014 |
| CN | 108357242 | 8/2018 |
| KR | 20100050896 | 5/2010 |
| TW | M258359 | 3/2005 |
| TW | 200807278 | 2/2008 |
| TW | M400613 | 3/2011 |
| WO | 2006049275 | 5/2006 |

OTHER PUBLICATIONS

"Search Report of Europe Counterpart Application", dated May 19, 2020, p. 1-p. 5.
"Office Action of Taiwan Counterpart Application," dated Aug. 30, 2019, p. 1-p. 4.

* cited by examiner

*Primary Examiner* — Kenneth Bukowski
(74) *Attorney, Agent, or Firm* — JCIPRNET

(57) ABSTRACT

A pen-shaped folding mouse includes a scroll wheel, two supporting shafts, two rod bodies, two buttons, and an optical sensor. The scroll wheel has an axis line. The two supporting shafts are disposed on two opposite sides of the scroll wheel and are parallel to the axis line. The two rod bodies are located on the two opposite sides of the scroll wheel and are movably disposed on the two supporting shafts. The two rod bodies include two outer surfaces and two first end surfaces close to each other. The two buttons are disposed on the two outer surfaces of the two rod bodies. The optical sensor is located on the outer surface of one of the rod bodies.

14 Claims, 16 Drawing Sheets

PEN-SHAPED FOLDING MOUSE

ROSS-REFERENCE TO RELATED APPLICATION

This application claims the priority benefit of Taiwan application serial no. 107147557, filed on Dec. 28, 2018. The entirety of the above-mentioned patent application is hereby incorporated by reference herein and made a part of this specification.

BACKGROUND

Technical Field

The invention relates to a mouse. More particularly, the invention relates to a pen-shaped folding mouse.

Description of Related Art

Mouse devices are important devices configured to control movement of cursors in the modern computer system. Mice provided in the current market have certain volume and specific shapes to provide favorable hand feeling and create convenient using experiences for users, so the mice may not be stored easily. Further, a user sometimes has to carry a presentation pen along with a mouse according to needs, so the user may feel inconveniently when it is required to carry the two devices at the same time.

SUMMARY

The invention provides a pen-shaped folding mouse capable of being transformed between a mouse shape and a pen shaft shape.

A pen-shaped folding mouse provided by the invention includes a scroll wheel, two supporting shafts, two rod bodies, two buttons, and an optical sensor. The scroll wheel has an axis line. The two supporting shafts are disposed on two opposite sides of the scroll wheel and are parallel to the axis line. The two rod bodies are located on the two opposite sides of the scroll wheel and are movably disposed on the two supporting shafts. The two rod bodies include two outer surfaces and two first end surfaces adjacent to the scroll wheel. The two buttons are disposed on the two outer surfaces of the two rod bodies. The optical sensor is located on the outer surface of one of the rod bodies. The two first end surfaces face the two opposite sides of the scroll wheel when the two rod bodies are at a first position. The two rod bodies and the scroll wheel extend along the axis line so that a pen shaft shape is presented. The two rod bodies are adapted to move relative to the scroll wheel from the first position to a second position so that the two outer surfaces of the two rod bodies face the two opposite sides of the scroll wheel and approach each other. The two rod bodies, the scroll wheel, the optical sensor, and the two buttons form a mouse together, and the two buttons function as a left button and a right button of the mouse.

In an embodiment of the invention, each of the rod bodies has a sliding block located at an inner portion of each of the rod bodies. Each of the supporting shafts includes a sliding slot. The sliding block is adapted to slide and rotate in the sliding slot. The sliding block is located at a first end in each of the sliding slots when each of the two rod bodies is located at the first position. The sliding block is adapted to be turned after sliding to a second end in each of the sliding slots to secure the two rod bodies to the second position.

In an embodiment of the invention, each of the rod bodies further includes a first positioning portion and a second positioning portion. Each of the supporting shafts further includes a first engaging portion. The first positioning portion in each of the rod bodies is engaged with the first engaging portion of the corresponding supporting shaft when the two rod bodies are located at the first position. Each of the sliding blocks is adapted to be turned after sliding to a second end in each of the sliding slots so that the second positioning portion in each of the rod bodies is engaged with the first engaging portion in the corresponding supporting shaft.

In an embodiment of the invention, each of the rod bodies further includes a first positioning portion, and each of the supporting shafts further includes a first engaging portion and a second engaging portion. The first positioning portion in each of the rod bodies is engaged with the first engaging portion in the corresponding supporting shaft when the two rod bodies are located at the first position. Each of the sliding blocks is adapted to be turned after sliding to a second end in each of the sliding slots so that the first positioning portion in each of the rod bodies is engaged with the second engaging portion in the corresponding supporting shaft.

In an embodiment of the invention, the sliding block has a first positioning portion and a second positioning portion. The first positioning portion is located on a first height relative to an inner surface of the rod body and extends in a first direction. The second positioning portion is located on a second height relative to the inner surface and extends in a second direction. Each of the supporting shafts further includes a first positioning recess and a second positioning recess connected to the sliding slot and located at different depths. The first positioning recess is close to a first end of the sliding slot. The second positioning recess is close to a second end of the sliding slot. Each of the sliding blocks is located at the first end in the sliding slot and each of the first positioning portions is engaged with the corresponding first positioning recess when the two rod bodies are located at the first position. Each of the sliding blocks is adapted to be turned after sliding to the second end in the sliding slot so that the second positioning portion in each of the rod bodies is engaged with the corresponding second positioning recess.

In an embodiment of the invention, the two rod bodies include two first magnetic members. Each of the first magnetic members is located at an end portion on the corresponding rod body adjacent to the scroll wheel. The two first magnetic members of the two rod bodies approach the scroll wheel and attract each other so that the pen shaft shape is maintained when the two rod bodies are at the first position.

In an embodiment of the invention, the two rod bodies further include two second magnetic members, and each of the second magnetic members is located at an end portion on the corresponding rod body distant from the scroll wheel. The two second magnetic members of the two rod bodies attract each other so that a shape of the mouse is maintained when the two rod bodies are at the second position.

In an embodiment of the invention, the scroll wheel includes a wheel frame, a wheel ring, and a pressure sensor. The two supporting shafts are disposed at two side surfaces of the wheel frame. The wheel ring covers at least a portion of the wheel frame and is movably disposed at the wheel frame. The pressure sensor is located at an inner side of the wheel ring to sense pressing on the wheel ring.

In an embodiment of the invention, the scroll wheel includes a scroll sensor located at the inner side of the wheel ring to sense scrolling of the wheel ring.

In an embodiment of the invention, one of the rod bodies further includes a scroll sensor located at the outer surface and close to the scroll wheel. The scroll sensor is configured to sense scrolling of the wheel ring when the two rod bodies are at the second position.

In an embodiment of the invention, one of the rod bodies further includes a circuit board and a flexible flat cable located at an inner portion of the rod body. The flexible flat cable is attached onto the corresponding supporting shaft and is connected to the circuit board and the pressure sensor.

In an embodiment of the invention, one of the rod bodies further includes a circuit board located at an inner portion of the rod body and two metal sheets electrically connected to the circuit board. The supporting shaft corresponding to the rod body including the two metal sheets includes two conductors electrically connected to the pressure sensor. The two metal sheets are in contact with the corresponding two conductors so that the pressure sensor is electrically connected to the circuit board.

In an embodiment of the invention, the two rod bodies include two protrusions located on the two outer surfaces and adjacent to the scroll wheel. A distance between a top portion of each of the protrusions and the axis line is greater than a radius of the scroll wheel.

In an embodiment of the invention, the pen-shaped folding mouse further includes an infrared ray transmitter. The infrared ray transmitter is located on a second end surface of one of the rod bodies distant from the scroll wheel.

To sum up, the two rod bodies of the pen-shaped folding mouse provided by the invention may be transformed between the first position and the second position. When a user has to use a mouse, the user may transform the two rod bodies to the second position. When the user does not have to use the mouse, the user may transform the two rod bodies to the first position so the pen shaft shape is presented, and that the user may carry the pen-shaped folding mouse conveniently. Further, when being in the pen shaft shape, the pen-shaped folding mouse may feature functions different from that when being in the mouse shape.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
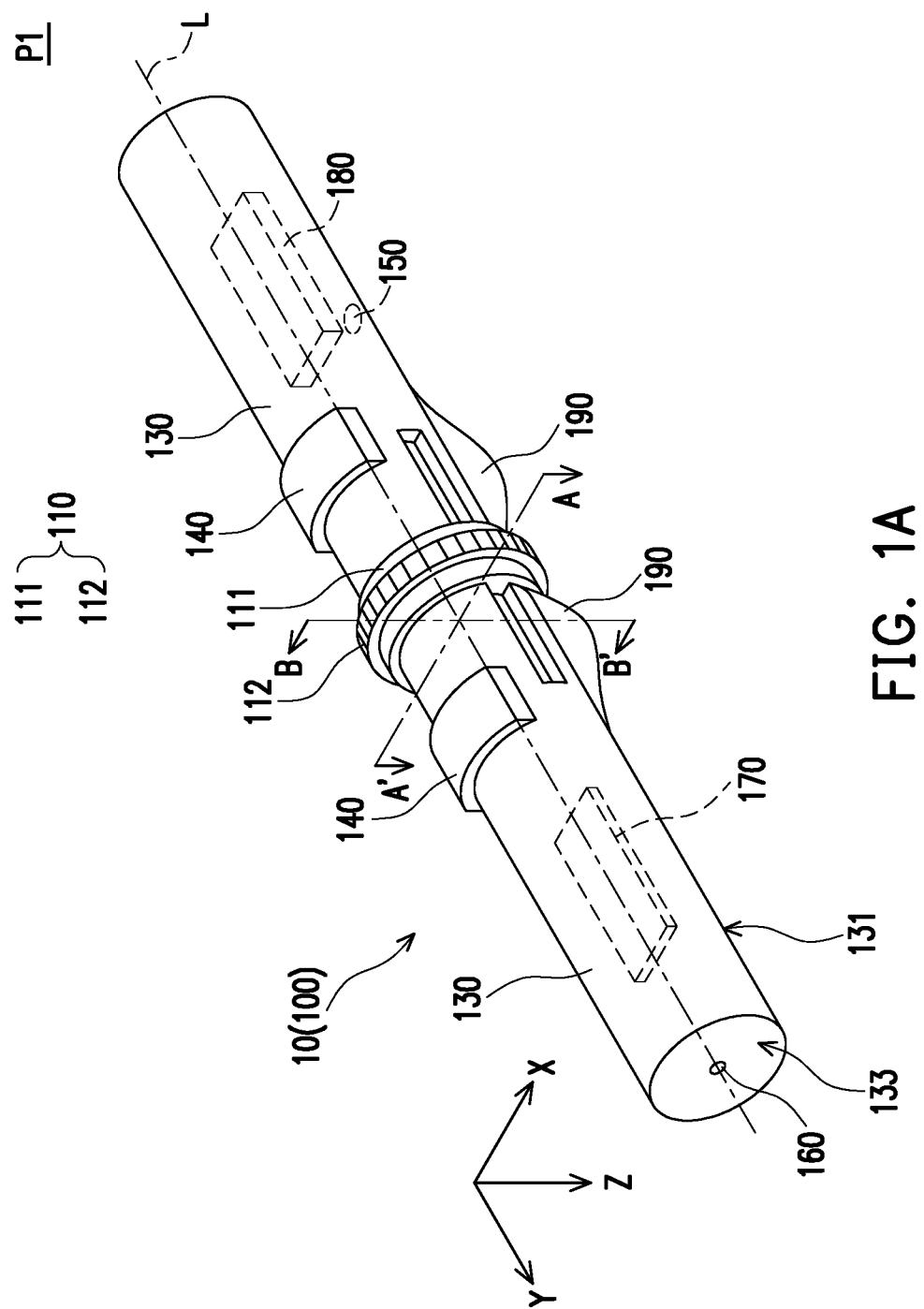
FIG. 1A is a schematic view of a pen-shaped folding mouse of a first embodiment of the invention with two rod bodies located at a first position.
Figure 1B:
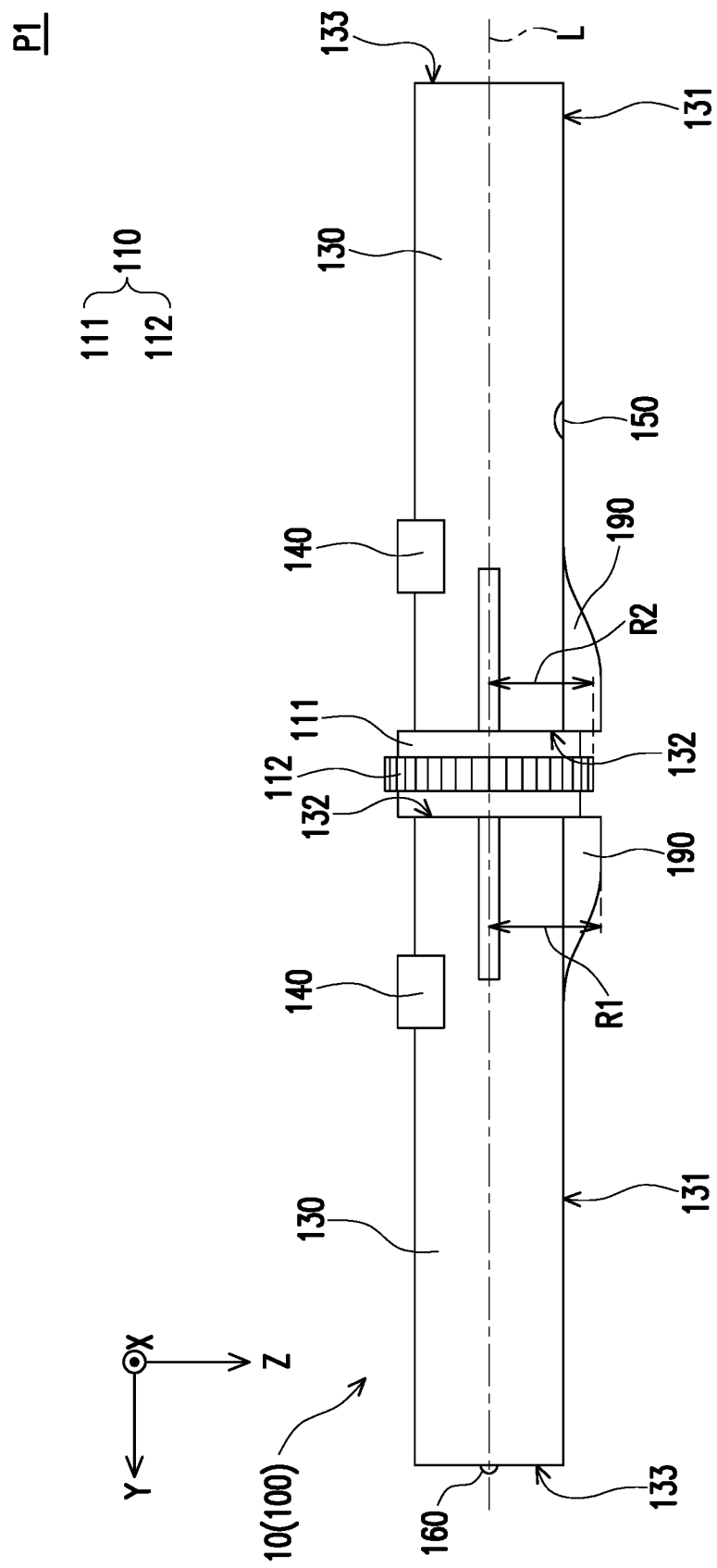
FIG. 1B is a side view of the pen-shaped folding mouse of FIG. 1A with the two rod bodies located at the first position.
Figure 2:
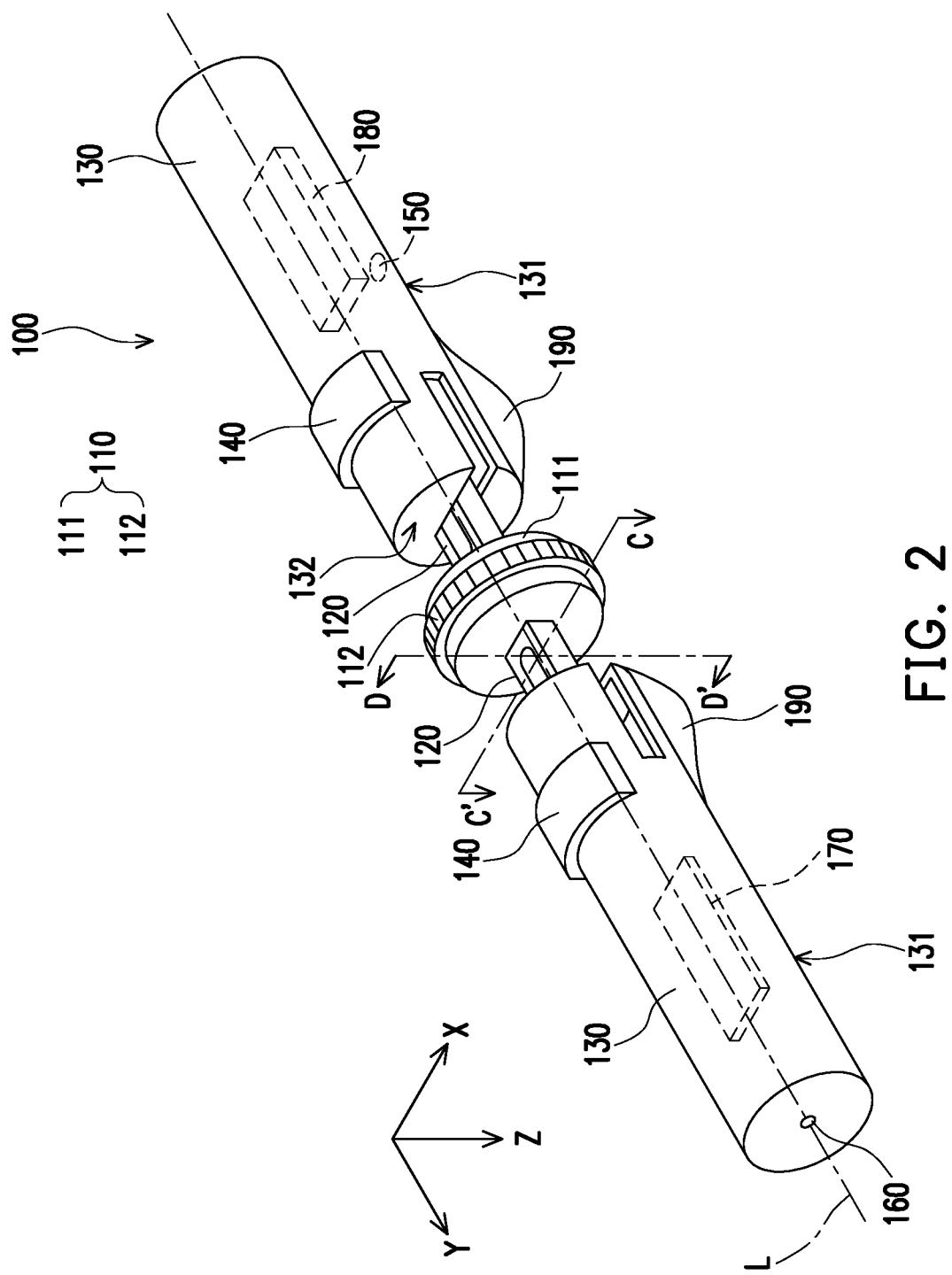
FIG. 2 is schematic view of the pen-shaped folding mouse of the first embodiment of the invention with the two rod bodies separated from a scroll wheel towards an axis line direction.
Figure 3:
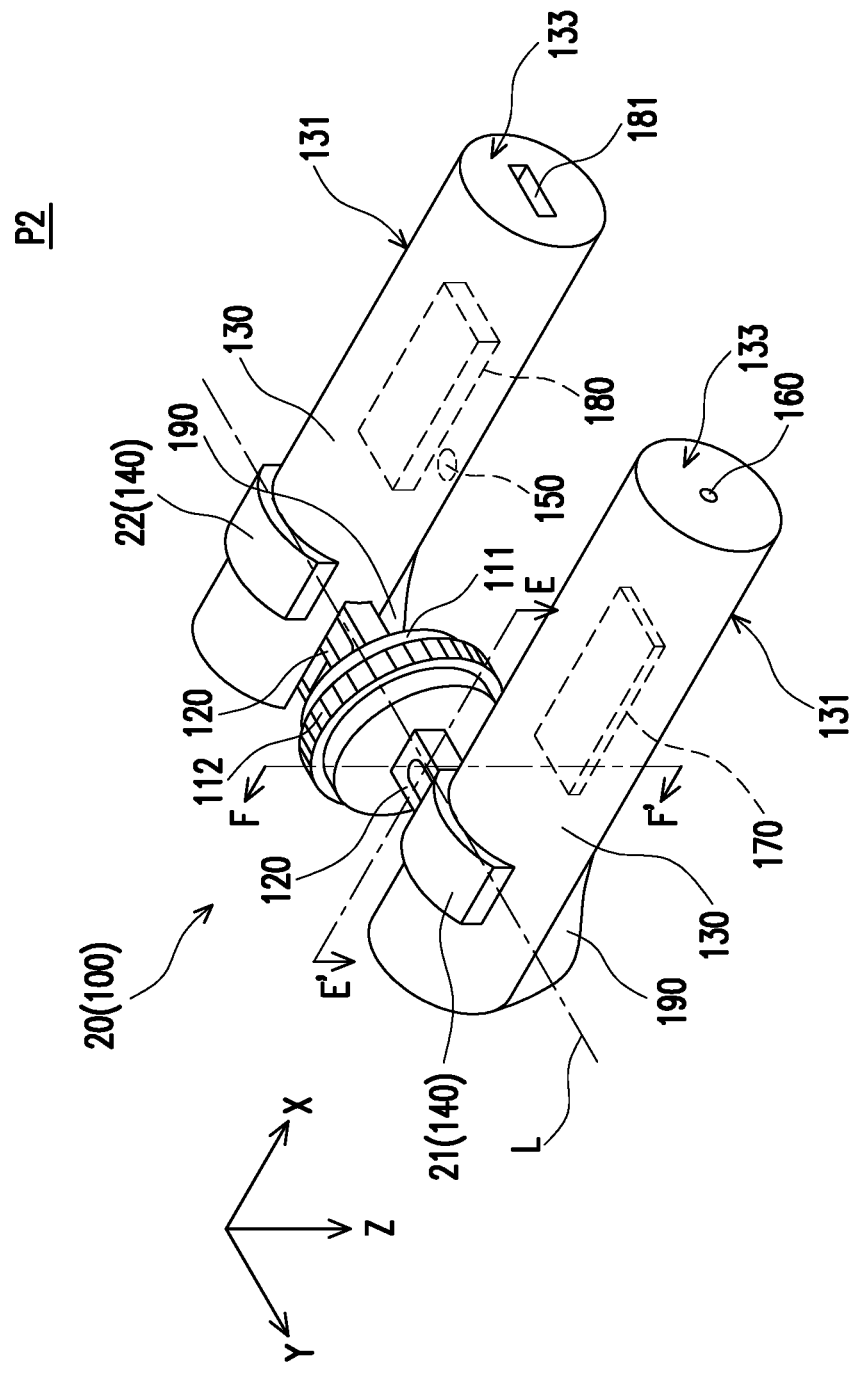
FIG. 3 is a schematic view of the pen-shaped folding mouse of the first embodiment of the invention with the two rod bodies located at a second position.

FIG. 1A is a schematic view of a pen-shaped folding mouse of a first embodiment of the invention with two rod bodies located at a first position. FIG. 1B is a side view of the pen-shaped folding mouse of FIG. 1A with the two rod bodies located at the first position. FIG. 2 is schematic view of the pen-shaped folding mouse of the first embodiment of the invention with the two rod bodies separated from a scroll wheel towards an axis line direction. FIG. 3 is a schematic view of the pen-shaped folding mouse of the first embodiment of the invention with the two rod bodies located at a second position.

With reference to FIG. 1A to FIG. 3, a pen-shaped folding mouse 100 includes a scroll wheel 110, two supporting shafts 120 (FIG. 2), two rod bodies 130, two buttons 140, an optical sensor 150, and an infrared ray transmitter 160. The scroll wheel 110 has an axis line L extending in a Y direction. The scroll wheel has a wheel frame 111 and a wheel ring 112. The wheel ring 112 surrounds the wheel frame 111 and may scroll relative to the wheel frame 111.

As shown in FIG. 2, the two supporting shafts 120 are disposed at two opposite sides of the scroll wheel 110 and extend into the two rod bodies 130. Each of the supporting shafts 120 may extend from the two opposite sides of the wheel frame 111 of the scroll wheel 110 along the axis line L or may be disposed to be parallel and next to the axis line L. The two rod bodies 130 are located at the two opposite sides of the wheel frame 111 of the scroll wheel 110 and may be movably disposed on the two supporting shafts 120, so that the two rod bodies 130 are adapted to be transformed between a first position P1 as shown in FIG. 1A and a second position P2 as shown in FIG. 3.

As shown in FIG. 1B, in this embodiment, the two rod bodies 130 include two outer surfaces 131 and two first end surfaces 132 adjacent to the scroll wheel 110. When the two rod bodies 130 are at the first position P1, the two first end surfaces 132 approach and are attached to the two opposite sides of the wheel frame 111 of the scroll wheel 110. The two buttons 140 are disposed on the two outer surfaces 131 of the two rod bodies 130. The optical sensor 150 is located on the outer surface 131 of one of the rod bodies 130. The infrared ray transmitter 160 is located on a second end surface 133 of one of the rod bodies 130 distant from the scroll wheel 110. Certainly, in other embodiments, the optical sensor 150 and the infrared ray transmitter 160 may both be located on the same rod body 130.

In this embodiment, the rod body 130 including the infrared ray transmitter 160 has a circuit board 170 disposed therein, and the other rod body 130 has a battery 180 (the circuit board 170 and the battery 180 are both depicted with dotted lines) and a charging port 181 (as shown in FIG. 3) of the battery 180 disposed therein. The circuit board 170, the optical sensor 150, the two buttons 140, the infrared ray transmitter 160, and a variety of sensing mechanisms to be described later are electrically connected to one another and are powered by the battery 180. Further, the circuit board 170 enables the pen-shaped folding mouse 100 to feature different functions in different states according to design needs.

The following describes a process of movement of the two rod bodies 130 of the pen-shaped folding mouse 100 provided by the first embodiment of the invention from the first position P1 (FIG. 1A) to the second position P2 (FIG. 3). With reference to FIG. 1A, when the two rod bodies 130 are located at the first position P1, the two first end surfaces 132 face the two opposite sides of the wheel frame 111 of the scroll wheel 110. The two rod bodies 130 and the scroll wheel 110 extend along the axis line L so that a pen shaft shape 10 is presented.

When the pen-shaped folding mouse 100 is in the state of the pen shaft shape 10, the pen-shaped folding mouse 100 of FIG. 1A may be used as, for example, a presentation pen. The circuit board 170 has, for example, a bluetooth module (not shown) and thus is capable of transmitting signals with a hardware apparatus (e.g., a personal computer, a notebook computer, a tablet computer, or other apparatuses, not shown), and the circuit board 170 is also capable of controlling presentation software (e.g., Microsoft® PowerPoint®) stored in the hardware apparatus through functioning of the two buttons 140 or the scroll wheel 110. For instance, in the state of the pen shaft shape 10, a pressure sensor (to be described later) in the scroll wheel 110 may function as, for example, a switch of the infrared ray transmitter 160, and the two buttons 140 may control the previous/next page function of the presentation software at the same time. Each component may be provided with a different function according to needs when using the pen-shaped folding mouse 100, which is not limited by the invention in this regard.

Next, when the pen-shaped folding mouse 100 is to be transformed, with reference to FIG. 2, the two rod bodies 130 separate from each other along the axis line L in an opposite direction. As such, the two first end surfaces 132 of the two rod bodies 130 are distant from the scroll wheel 110, and the two supporting shafts 120 connected between the two rod bodies 130 and the scroll wheel 110 are exposed. Next, as shown in FIG. 3, the two outer surfaces 131 of the two rod bodies 130 rotate towards the two opposite sides of the wheel frame 111 of the scroll wheel 110 and approach each other. Such rotation process may be completed through, for example, movement between the supporting shafts 120 and the rod bodies 130 to be described later. Alternatively, in other embodiments, the supporting shafts themselves may be flexible metal and are adapted to be bent, or the rod bodies themselves may be flexible metal in some embodiments.

In this embodiment, the two rod bodies 130 extend in an X direction and are located at the second position P2 owing to the rotation. When the two rod bodies 130 are located at the second position P2, the two rod bodies 130, the scroll wheel 110, the optical sensor 150, and the two buttons 140 together form a mouse 20, and a function different from the function of each of the components when the pen-shaped folding mouse 100 is at the first position P1 is given to each of the components through the circuit board 170.

For instance, the circuit board 170 may perform signal transmission with another hardware apparatus (not shown) through a bluetooth module (not shown). The two buttons 140 may function as a left button 21 and a right button 22 of the mouse 20. The optical sensor 150 may serve as a controller of the mouse 20 configured to control a cursor position on a display screen of the hardware apparatus. The scroll wheel 110 may function as a general scroll wheel of a mouse, for example, to provide page sliding or switching function on the display screen for software stored in the hardware apparatus.

Note that in order to allow the pen-shaped folding mouse 100 of the invention to be smoothly operated at the second position P2 (that is, the mouse 20), the two rod bodies 130 may include two protrusions 190 located on the two outer surfaces 131 and adjacent to the scroll wheel. With reference to FIG. 1B, a distance R1 between a top portion of each of the protrusions 190 and the axis line L is greater than a radius R2 of an outermost side of the scroll wheel 110 (the radius between an outermost side of the wheel ring 112 and the axis line L in this embodiment). Through such configuration, when the pen-shaped folding mouse 100 located at the second position P2 is placed on a plane, the wheel ring 112 of the scroll wheel 110 is suspended and thus can smoothly scroll instead of interfering with the plane when scrolling. Similarly, a radial dimension of the rod bodies 130 may be greater than a radial dimension of the scroll wheel 110, so that the wheel ring 112 of the scroll wheel 110 may be suspended and can thus smoothly scroll as well. In addition, in this embodiment, the outer surfaces 131 are surfaces of the cylindrical rod bodies 130, the rod bodies 130 are not limited to be cylinder-shaped. In other embodiments, each of the rod bodies may be, for example, a cuboid, a circular cone, or other types of prisms or cones, which is not limited by the invention in this regard.

As described above, based on the moving principles of the pen-shaped folding mouse 100 of the invention, it can be seen that the pen-shaped folding mouse 100 features different functions when being switched between the first position P1 and the second position P2. At the first position P1, the pen-shaped folding mouse 100 is presented as the pen shaft shape 10, so it is convenient for a user to carry the pen-shaped folding mouse 100, or the pen-shaped folding mouse 100 may function as, for example, a presentation pen. At the second position, the pen-shaped folding mouse 100 functions as the mouse 20. Such switching mechanism allows the user to use and carry the pen-shaped folding mouse 100 more conveniently.

The following description describes how internal components of the pen-shaped folding mouse 100 of this invention move when the pen-shaped folding mouse 100 is switched between the first position P1 and the second position P2.

Figure 4A:
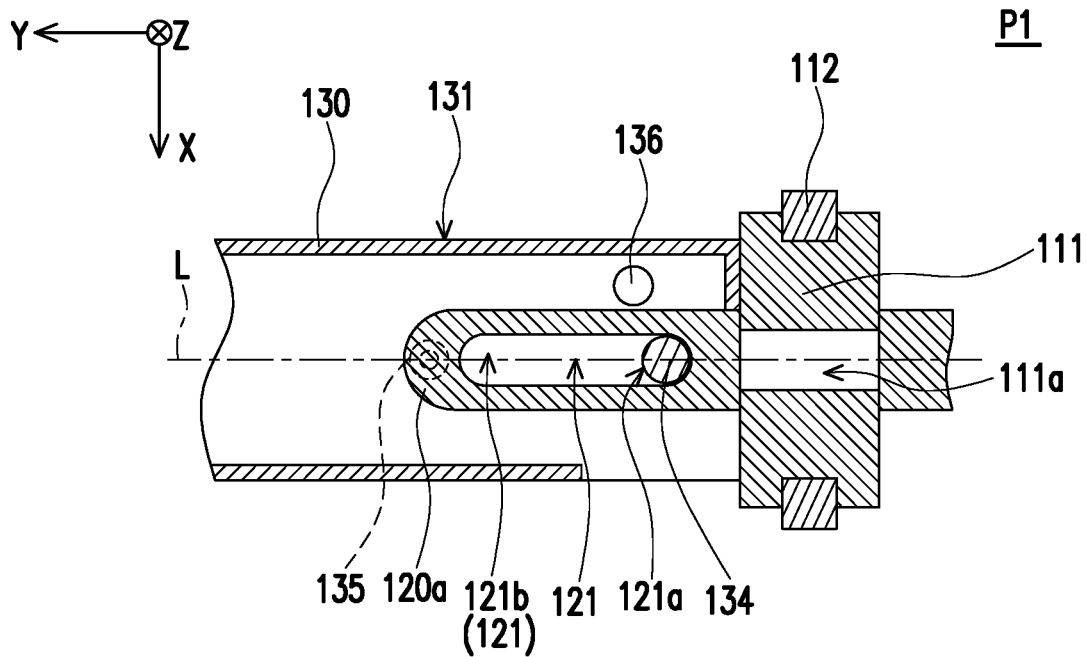
FIG. 4A is a local cross-sectional view taken along a line segment A-A' of the pen-shaped folding mouse of FIG. 1A.
Figure 4B:
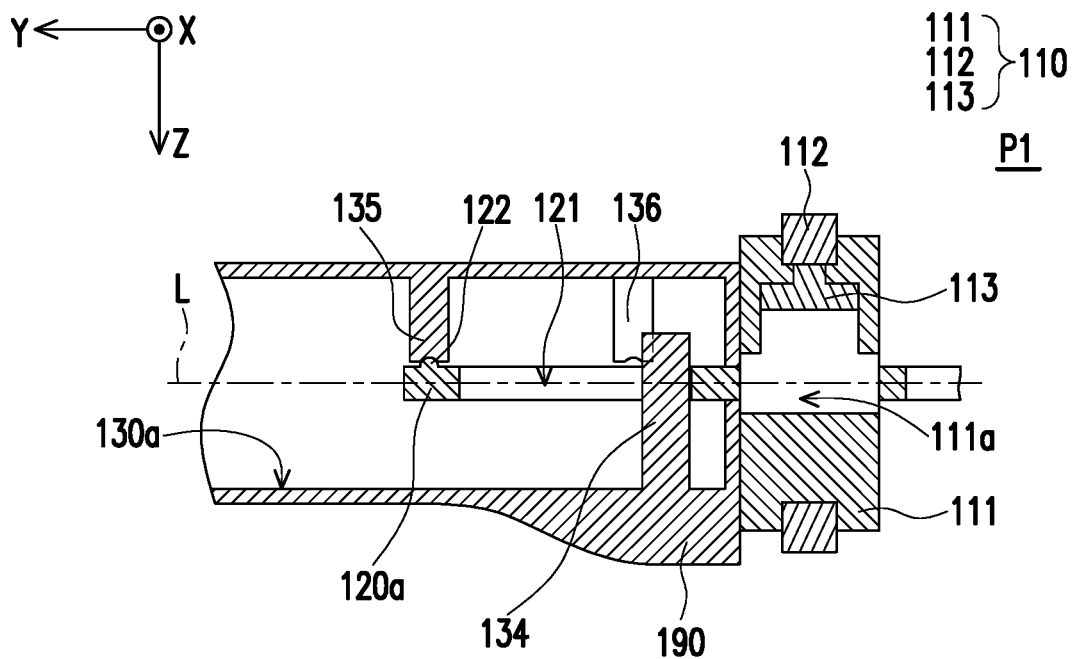
FIG. 4B is a local cross-sectional view taken along a line segment B-B' of the pen-shaped folding mouse of FIG. 1A.

FIG. 4A is a local cross-sectional view taken along a line segment A-A' of the pen-shaped folding mouse of FIG. 1A. FIG. 4B is a local cross-sectional view taken along a line segment B-B' of the pen-shaped folding mouse of FIG. 1A. In order to allow the description and illustration to be clearly presented, the following description is provided based on the supporting shaft 120 and the rod body 130 at one of the two opposite sides of the scroll wheel 110.

With reference to FIG. 1A, FIG. 4A, and FIG. 4B, in the pen-shaped folding mouse 100 of the first embodiment of the invention, each of the rod bodies 130 includes a sliding block 134, a first positioning portion 135, and a second positioning portion 136 (FIG. 4A) located in an inner portion of the rod body 130. Each of the supporting shafts 120 (FIG. 3) includes a sliding slot 121 and a first engaging portion 122.

As shown in FIG. 4B, the sliding block 134 may be a cylinder structure and is disposed at an inner surface 130a of the rod body 130. The sliding block 134 is inserted in the sliding slot 121 (FIG. 4A) and is adapted to slide and rotate in the sliding slot 121. The first engaging portion 122 is disposed on an end portion 120a of the supporting shaft 120 (FIG. 3) distant from the scroll wheel 110. When the rod body 130 is at the first position P1, the first positioning portion 135 in the rod body 130 is engaged with the first engaging portion 122 of the corresponding supporting shaft 120, and the sliding block 134 is located at a first end 121a in the sliding slot 121. The first engaging portion 122 is, for example, a protruding protrusion, and the first positioning portion 135 is, for example, a trench so that the first engaging portion 122 and the first positioning portion 135 may be engaged with each other.

Figure 5A:
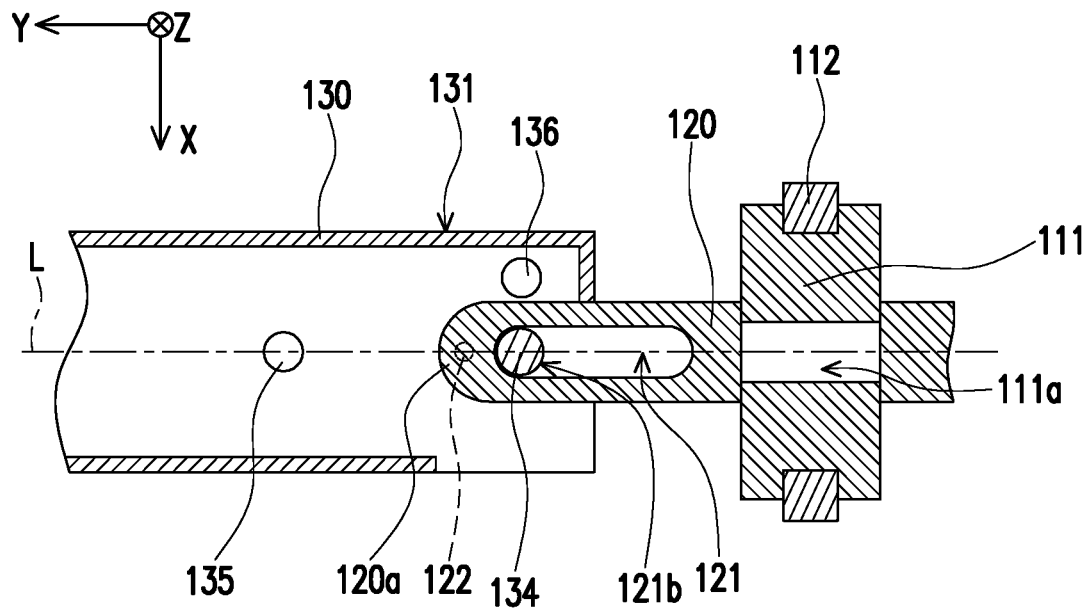
FIG. 5A is a local cross-sectional view taken along a line segment C-C' of the pen-shaped folding mouse of FIG. 2.
Figure 5B:
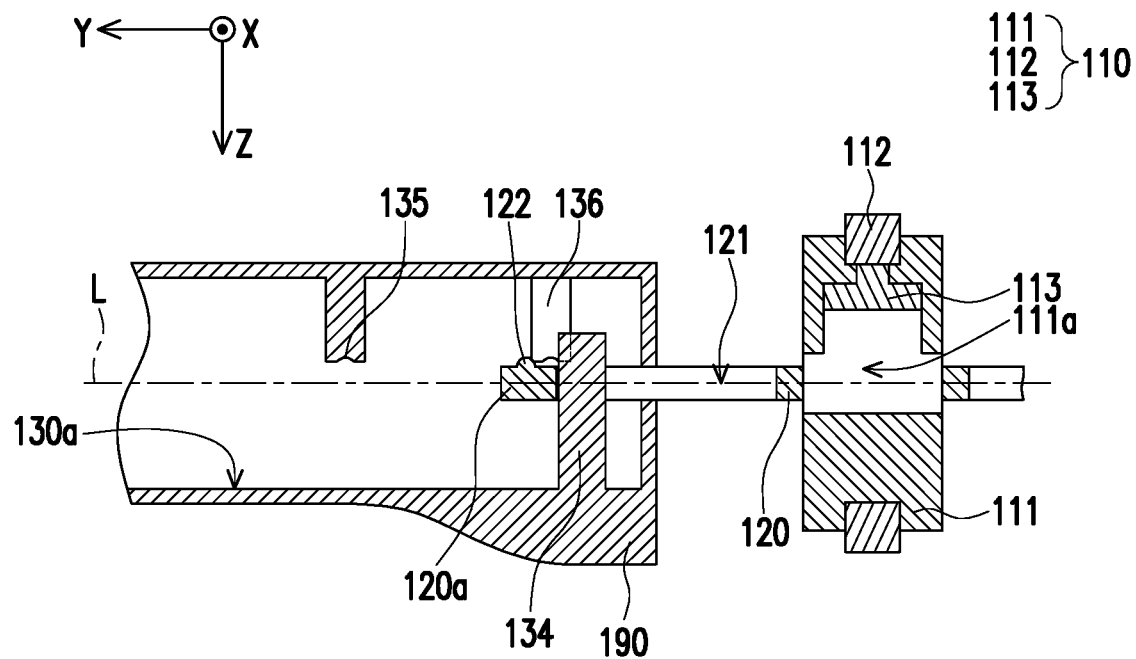
FIG. 5B is a local cross-sectional view taken along a line segment D-D' of the pen-shaped folding mouse of FIG. 2.

Since appearances of the first engaging portion 122 and the first positioning portion 135 are correspondingly designed as arc-shaped, the first engaging portion 122 and the first positioning portion 135 may be separated from each other when being applied by a force along the axis line L of the scroll wheel 110 by the user. FIG. 5A is a local cross-sectional view taken along a line segment C-C' of the pen-shaped folding mouse of FIG. 2. FIG. 5B is a local cross-sectional view taken along a line segment D-D' of the pen-shaped folding mouse of FIG. 2. With reference to FIG. 2, FIG. 5A, and FIG. 5B, the rod body 130 separated from the first engaging portion 122 is adapted to slide along the sliding slot 121 through the sliding block 134 to be separated from the supporting shaft 120 and the scroll wheel 110 on the axis line L of the scroll wheel 110 (that is, the Y direction). At the same time, the sliding block 134 is located at a second end 121b of the sliding slot 121.

Figure 6A:
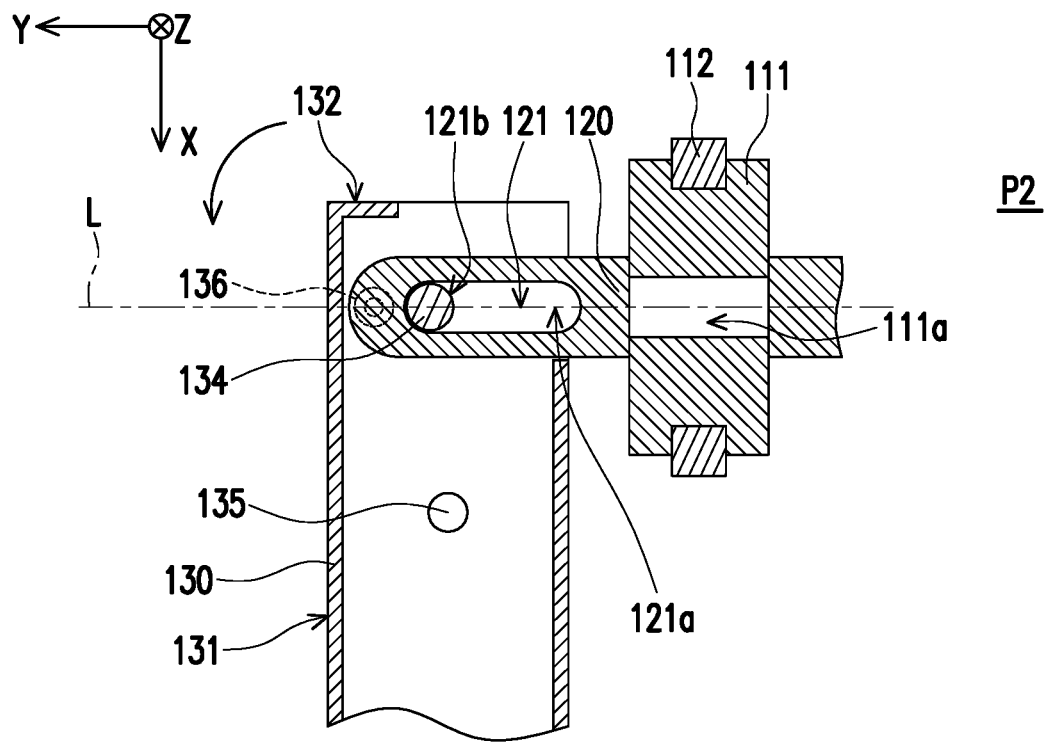
FIG. 6A is a local cross-sectional view taken along a line segment E-E' of the pen-shaped folding mouse of FIG. 3.
Figure 6B:
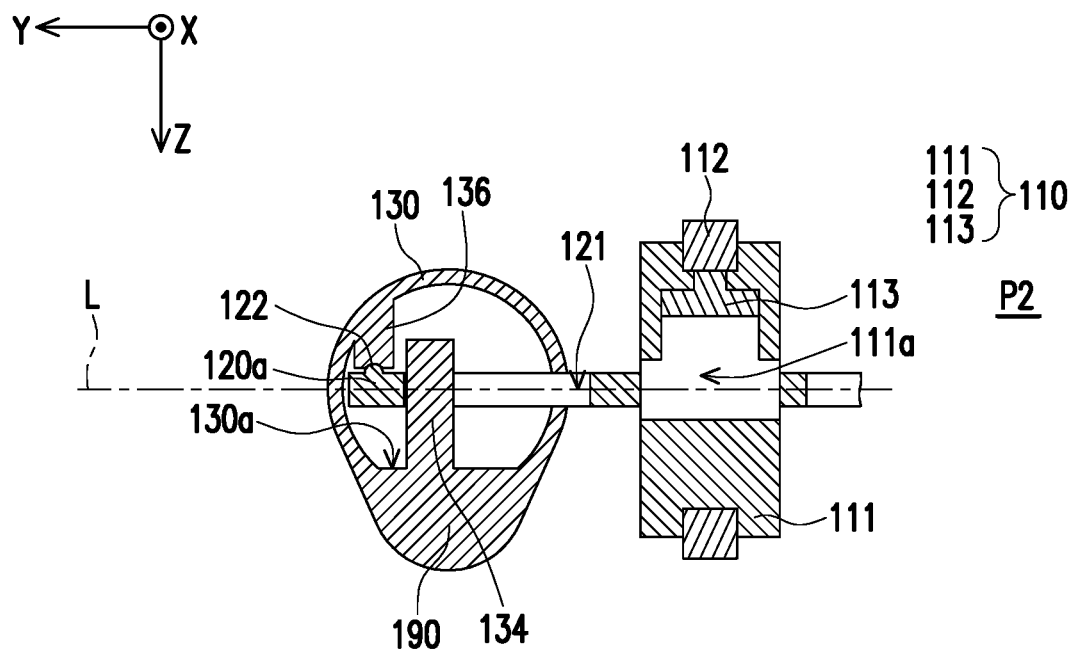
FIG. 6B is a local cross-sectional view taken along a line segment F-F' of the pen-shaped folding mouse of FIG. 3.

FIG. 6A is a local cross-sectional view taken along a line segment E-E' of the pen-shaped folding mouse of FIG. 3. FIG. 6B is a local cross-sectional view taken along a line segment F-F' of the pen-shaped folding mouse of FIG. 3. With reference to FIG. 3, FIG. 6A, and FIG. 6B, next, the user may rotate the rod body 130 relative to the scroll wheel 110 by 90 degrees. The sliding block 134 is turned at the second end 121b of the sliding slot 121, so that the second positioning portion 136 in the rod body 130 is engaged with the first engaging portion 122 of the supporting shaft 120 and the pen-shaped folding mouse 100 of the invention is secured to the second position P2, so an appearance of the mouse 20 is thus presented. The second positioning portion 136 and, for example, the first positioning portion 135 may be made of the same material and may be made based on the same configuration, and related description is not provided herein.

In other embodiments, the second positioning portion and the first positioning portion may both be protrusions, and the first engaging portion may be a trench corresponding to a shape of the protrusions and may thus be engaged with the second positioning portion and the first positioning portion. Alternatively, the second positioning portion and the first positioning portion may both be magnetic members, and the first engaging portion may be attracted by a magnetic material. Alternatively, the first engaging portion may be a magnetic member, and the second positioning portion and the first positioning portion may both be attracted by the magnetic material. Alternatively, the second positioning portion, the first positioning portion, and the first engaging portion may all be magnetic members and are attracted by one another at the first position and the second position.

Note that as shown in FIG. 6A, the wheel frame 111 of the scroll wheel 110 has a cross-section shaped as a H and has an annular groove in appearance in this embodiment. A shape of the wheel ring 112 is matched with a shape of the annular groove, and the wheel ring 112 is adapted to scroll relative to the wheel frame 111. An auxiliary sliding structure such as a scroll ball (not shown) may be embedded between the wheel frame 111 and the wheel ring 112 for smooth scrolling of the wheel ring 112. Besides, as shown in FIG. 6B, a receiving space 111a is provided in the wheel frame 111 in this embodiment. The receiving space 111a contains a sensing assembly 113 disposed at an inner side of the wheel ring 112. Further, when the pen-shaped folding mouse 100 is presented as the mouse 20, the sensing assembly 113 approaches a side of the wheel ring 112 used by the user for scrolling. Specifically, the sensing assembly 113 may include the pressure sensor and the scroll sensor and is configured to sense scrolling of the wheel ring 112 and pressing on the wheel ring 112 performed by the user. In addition, the receiving space 111a extends to the two opposite sides of the wheel frame 111, so as to provide a space served as a passage for a trace (not shown) electrically connected between the circuit board 170 and the sensing assembly 113 in the wheel frame 111. Nevertheless, in order to allow the drawings and description to be presented in a more organized and concise manner, such electrical connection structure is not shown in FIG. 4A to FIG. 6B.

Figure 7:
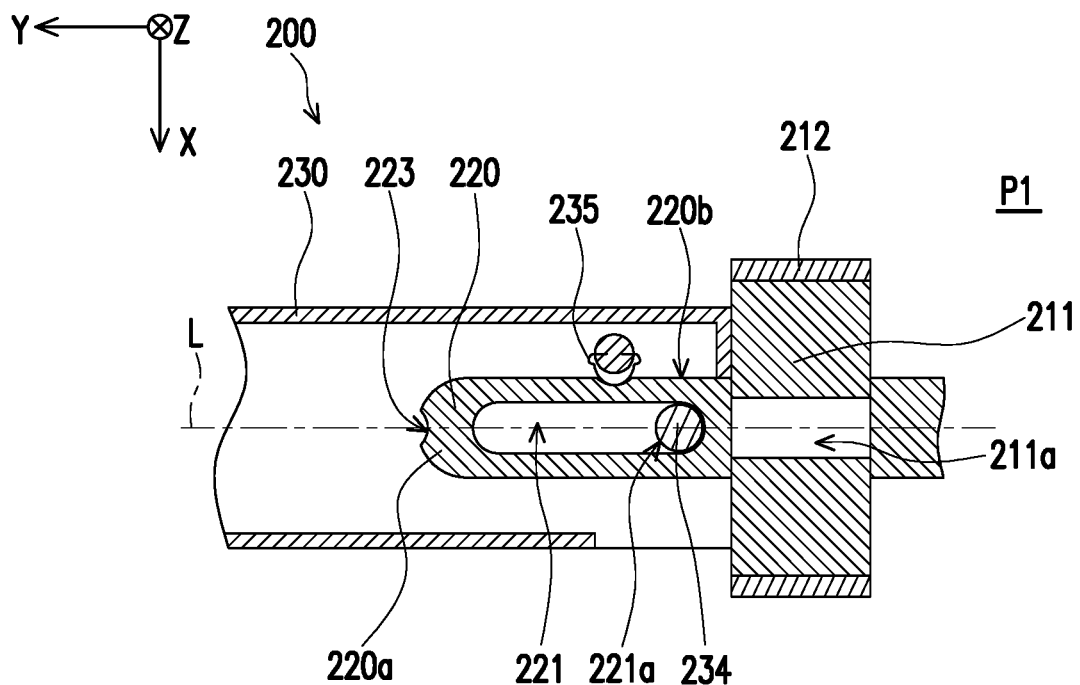
FIG. 7 is a local cross-sectional view of a pen-shaped folding mouse of a second embodiment of the invention with rod bodies located at the first position.
Figure 8:
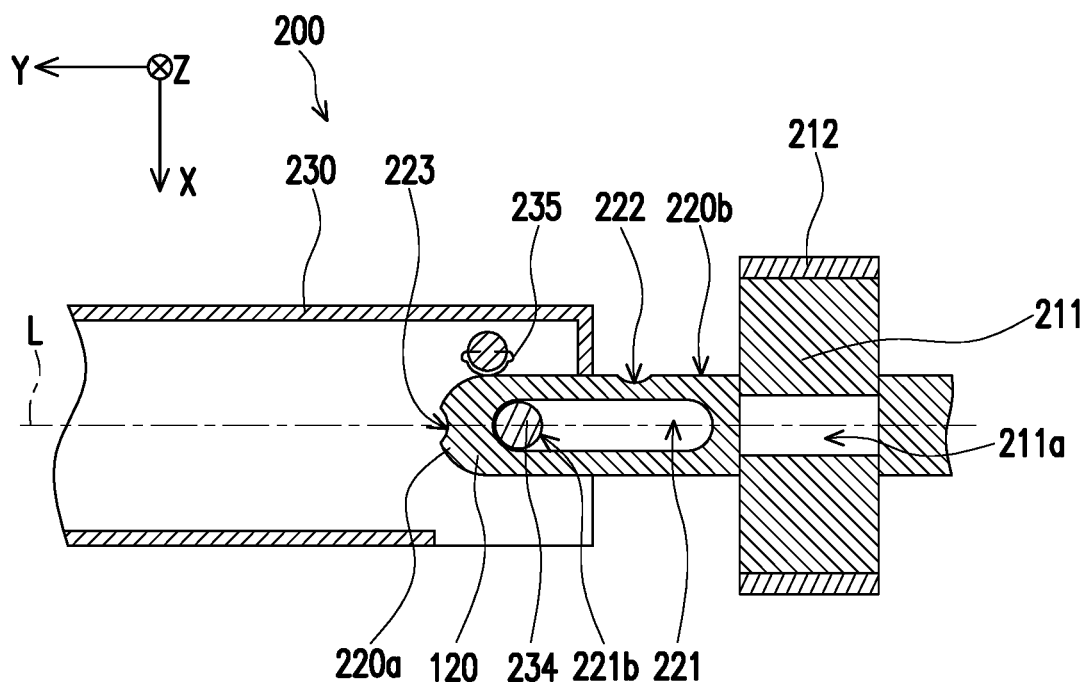
FIG. 8 is a local cross-sectional view of the pen-shaped folding mouse of the second embodiment of the invention with the rod bodies separated from a scroll wheel along the axis line.
Figure 9A:
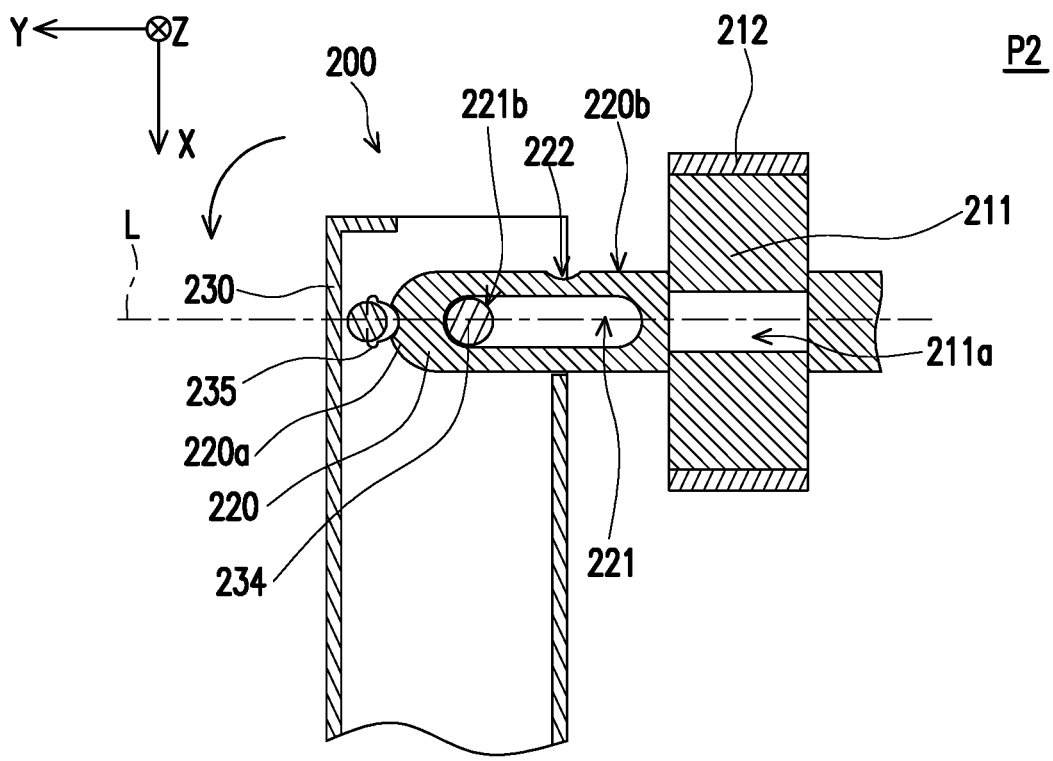
FIG. 9A is a local cross-sectional view of the pen-shaped folding mouse of the second embodiment of the invention with rod bodies located at the second position.
Figure 9B:
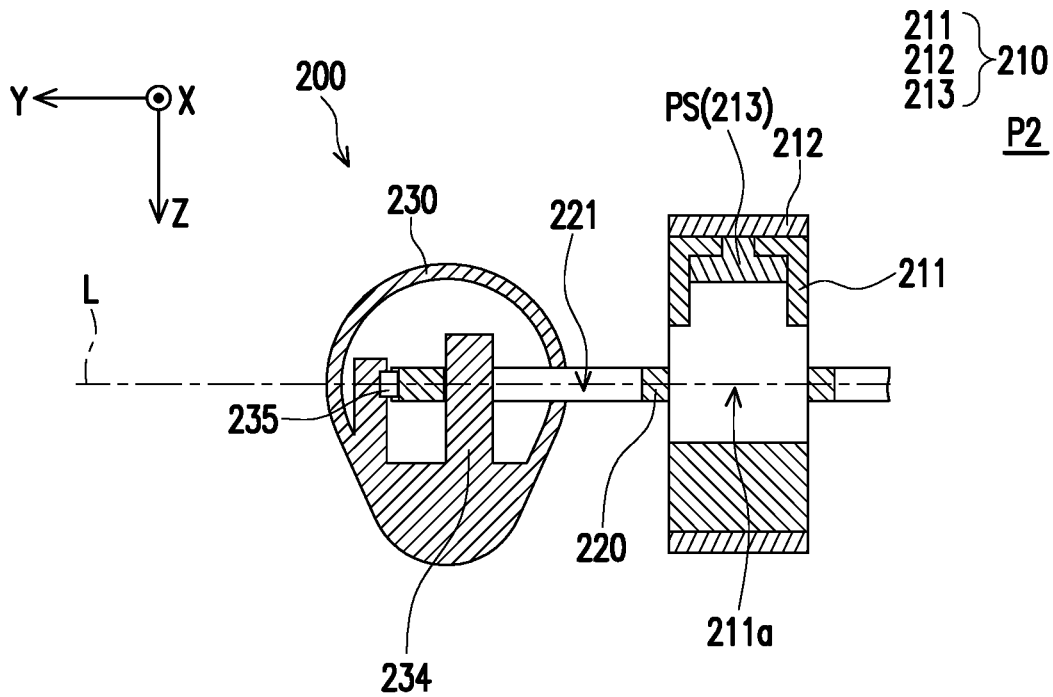
FIG. 9B is a local cross-sectional view of FIG. 9A from another viewing angle.
Figure 9C:
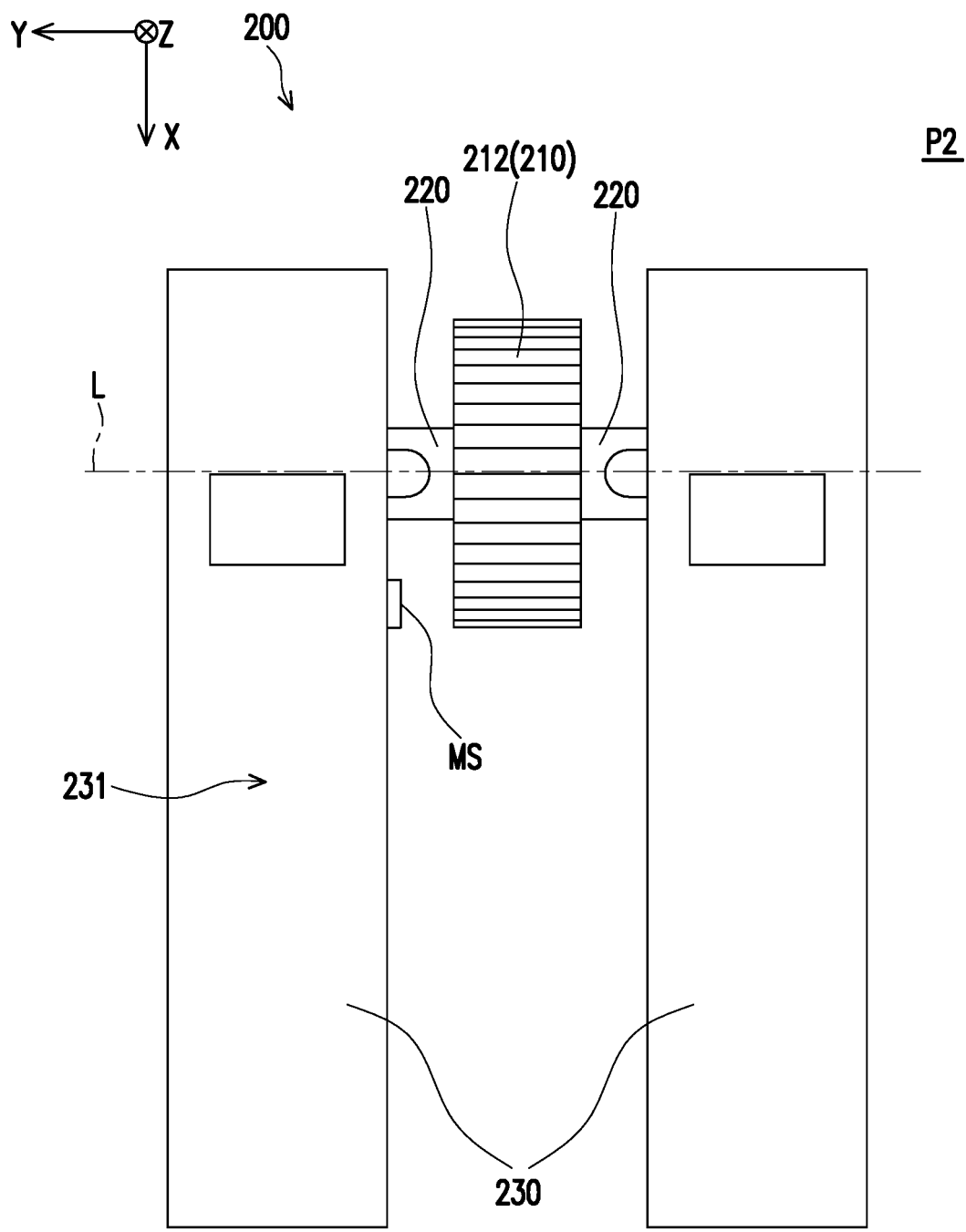
FIG. 9C is a top view of the pen-shaped folding mouse of FIG. 9A of the second embodiment of the invention at the second position.

FIG. 7 is a local cross-sectional view of a pen-shaped folding mouse of a second embodiment of the invention with rod bodies located at the first position. FIG. 8 is a local cross-sectional view of the pen-shaped folding mouse of the second embodiment of the invention with the rod bodies separated from a scroll wheel along the axis line. FIG. 9A is a local cross-sectional view of the pen-shaped folding mouse of the second embodiment of the invention with rod bodies located at the second position. FIG. 9B is a local cross-sectional view of FIG. 9A from another viewing angle. FIG. 9C is a top view of the pen-shaped folding mouse of FIG. 9A of the second embodiment of the invention at the second position. Viewing angles of FIG. 7, FIG. 8, and FIG. 9A respectively are identical to the viewing angles of FIG. 4A, FIG. 5A, and FIG. 6A. The viewing angle of FIG. 9B is identical to the viewing angle of 6B.

In order to allow the description and illustration to be clearly presented, the following description is provided based on a supporting shaft 220 and a rod body 230 at one of two opposite sides of a scroll wheel 210 in FIG. 9C. Besides, members and appearances of the members in this embodiment may be identical or similar to that of the first embodiment except the internal configurations of the supporting shafts 220 and the rod bodies 230, and related description is not provided herein.

With reference to FIG. 7 to FIG. 9C, FIG. 7 to FIG. 9C illustrate how internal components of a pen-shaped folding mouse 200 of the second embodiment of the invention are moved when the pen-shaped folding mouse 200 is switched from the first position P1 to the second position P2.

In the pen-shaped folding mouse 200 of the second embodiment of the invention, each of the rod bodies 230 includes a first positioning portion 235 and a sliding block 234 located at an inner portion of each of the rod bodies 230. Each of the supporting shafts 220 includes a first engaging portion 222, a second engaging portion 223, and a sliding slot 221. The sliding block 234 may be a cylinder structure and is disposed at an inner surface 230a of the rod body 230. The sliding block 234 is inserted in the sliding slot 221 and is adapted to slide and rotate in the sliding slot 221. The first engaging portion 222 is a notch recessed on a side surface 220b of the supporting shaft 220, and the second engaging portion 223 is a notch recessed on an end portion 220a of the supporting shaft 220 distant from the scroll wheel 210.

When the rod body 230 is at the first position P1, the first positioning portion 235 in the rod body 230 is engaged with the first engaging portion 222 of the corresponding supporting shaft 220, and the sliding block 234 is located at a first end 221a in the sliding slot 221. The first positioning portion 235 in the rod body 230 is, for example, a protruding metal elastic piece and is to be deformed after being applied by a force.

Since the first engaging portion 222 and the first positioning portion 235 are correspondingly designed as arc-shaped, the first engaging portion 222 and the first positioning portion 235 may be separated from each other when being applied by a force by the user. As shown in FIG. 8, the rod body 230 separated from the first engaging portion 222 is adapted to slide along the sliding slot 212 through the sliding block 234 to be separated from the supporting shaft 220 and the scroll wheel 210 in the direction of the axis line L of the scroll wheel 210 (that is, the Y direction). The first positioning portion 235 is pushed by the side surface 220b of the supporting shaft 220 and is pressed and slides along the side surface 220b, so that the sliding block 234 slides to a second end 221b of the sliding slot 221.

Next, the user may rotate the rod body 230 relative to the scroll wheel 210 by 90 degrees. As shown in FIG. 9A, the sliding block 234 may be turned at the second end 221b of the sliding slot 221. At this time, the first positioning portion 235 is ejected along the trench shape of the second engaging portion 223, so that the first positioning portion 235 in the rod body 230 is engaged with the second engaging portion 223 of the supporting shaft 220 and the pen-shaped folding mouse 200 of this embodiment is secured to the second position P2, so the appearance of the mouse 20 (as shown in FIG. 3) is presented.

In addition, a wheel ring 212 of the second embodiment of the invention completely covers a cylindrical surface of the wheel frame 211 and is adapted to scroll relative to the wheel frame 211. An auxiliary sliding structure such as a scroll ball (not shown) may also be embedded between the wheel frame 211 and the wheel ring 212 for smooth scrolling of the wheel ring 212. In addition, the wheel frame 211 may also include a receiving space 211a and a sensing assembly 213 similar or identical to that provided in the first embodiment, as shown in FIG. 9B.

Note that in this embodiment, the sensing assembly 213 may merely be a pressure sensor PS, and besides, a scroll sensor MS close to the scroll wheel 210 may be disposed on an outer surface 231 of one of the two rod bodies 230. As shown in FIG. 9C, when the two rod bodies are at the second position, the scroll sensor MS may overlap with the wheel ring 212 in, for example, the Y direction, to sense scrolling of the wheel ring 212. Similarly, in order to allow the drawings and description to be presented in a more organized and concise manner, such electrical connection structure of the sensing assembly 213 and the circuit board is not shown in FIG. 7 to FIG. 9B.

Figure 10:
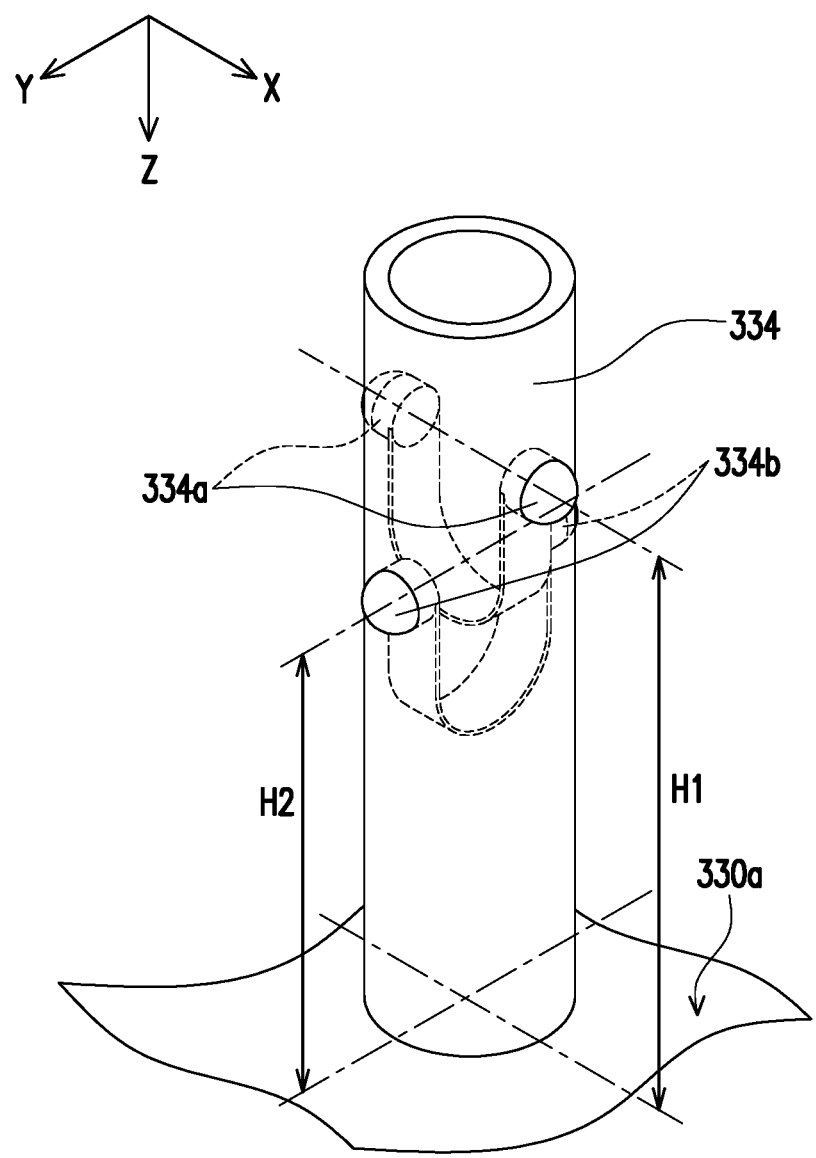
FIG. 10 is a schematic view of a sliding block according to a third embodiment of the invention.
Figure 11A:
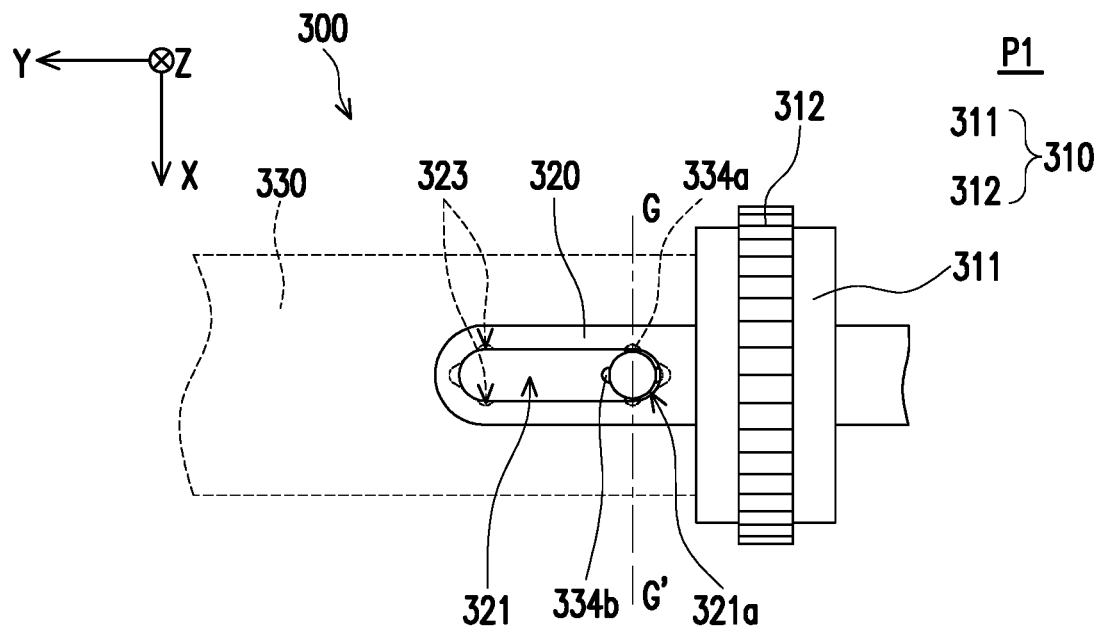
FIG. 11A is a local schematic view of a pen-shaped folding mouse of the third embodiment of the invention with rod bodies located at the first position.
Figure 11B:
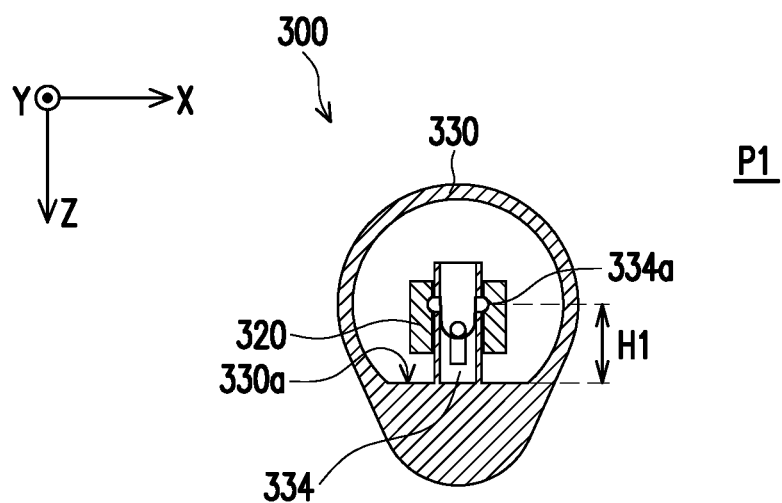
FIG. 11B is a cross-sectional view taken along a line segment G-G' of FIG. 11A.

FIG. 10 is a schematic view of a sliding block according to a third embodiment of the invention. FIG. 11A is a local schematic view of a pen-shaped folding mouse of the third embodiment of the invention with rod bodies located at the first position. FIG. 11B is a cross-sectional view taken along a line segment G-G' of FIG. 11A. The following refers to FIG. 10 first.

In order to allow the description and illustration to be clearly presented, the following description is provided based on a supporting shaft 320 and a rod body 330 at one of two opposite sides of a scroll wheel 310. Besides, members and appearances of the members in this embodiment may be identical or similar to that of the first embodiment except the internal configurations of the supporting shafts 320 and the rod bodies 330, and related description is not provided herein.

A sliding block 334 of the third embodiment is a cylinder structure and protrudes from an inner surface 330a of the rod body 330. The sliding block 334 has a first positioning portion 334a and a second positioning portion 334b. The first positioning portion 334a is located on a first height H1 relative to the inner surface 330a and extends in the X direction. The second positioning portion 334b is located on a second height H2 relative to the inner surface 330a and extends in the Y direction. The first height H1 is greater than the second height H2 so that the first positioning portion 334a and the second positioning portion 334b are arranged in a staggered manner in a Z direction. The first positioning portion 334a and the second positioning portion 334b have identical or similar elastic piece structures and are adapted to be deformed when being pushed.

With reference to FIG. 11A and FIG. 11B, the viewing angle of FIG. 11A is identical to the viewing angle of 4A. The supporting shaft 320 has a sliding slot 321, a first positioning recess 322 (FIG. 13A), and a second positioning recess 323. The first positioning recess 322 and the second positioning recess 323 have different depths relative to a top surface 320c of the supporting shaft 320 in the Z direction. In assembly, the first height H1 of the first positioning portion 334a corresponds to the first positioning recess 322, and the second height H2 of the second positioning portion 334b corresponds to the second positioning recess 323. The first positioning recess 322 is close to a first end 321a of the sliding slot 321 and is connected to the sliding slot 321. The second positioning recess 323 is close to a second end 321b of the sliding slot 321 and is connected to the sliding slot 321 (clearly shown in FIG. 12A). The sliding block 334 is adapted to slide and rotate in the sliding slot 321.

When the two rod bodies 330 are at the first position P1, the sliding blocks 334 are located at the first ends 321a of the sliding slots 321 and the protruding first positioning portions 334a are engaged with the first positioning recesses 322 corresponding to the shapes of the first positioning portions 334a.

Figure 12A:
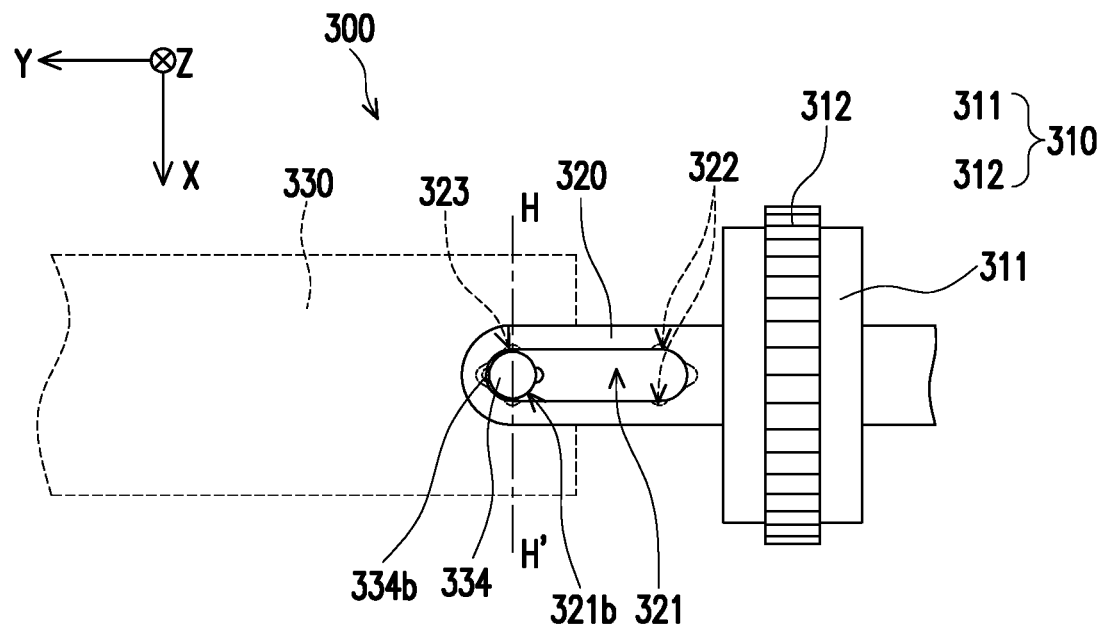
FIG. 12A is a local schematic view of the pen-shaped folding mouse of the third embodiment of the invention with the rod bodies separated from the scroll wheel towards the axis line direction.
Figure 12B:
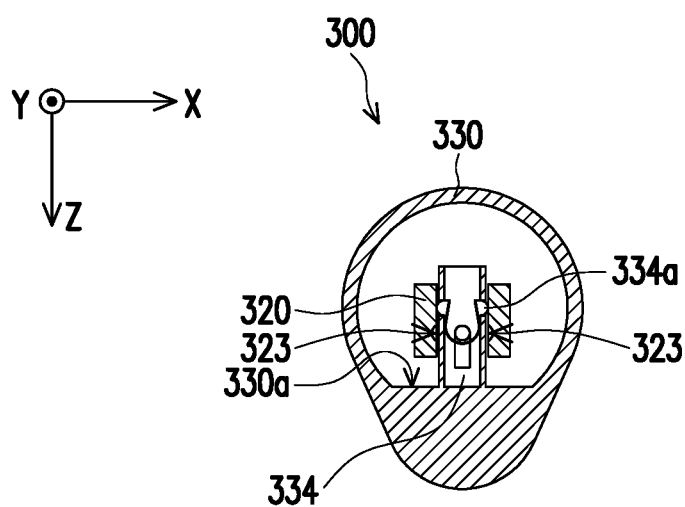
FIG. 12B is a cross-sectional view taken along a line segment H-H' of FIG. 12A.

FIG. 12A is a local schematic view of the pen-shaped folding mouse of the third embodiment of the invention with the rod bodies separated from the scroll wheel towards the axis line direction. FIG. 12B is a cross-sectional view taken along a line segment H-H' of FIG. 12A. With reference to FIG. 12A and FIG. 12B, the viewing angle of FIG. 12A is identical to the viewing angle of FIG. 5A. When the user performs an operation and the sliding block 324 moves from the first end 321a of the sliding slot 321 to the second end 321b, the first positioning portion 334a is pressed since a width of an inner wall surface of the sliding slot 321 in the X direction is narrower than a width of the first positioning recess 322 in the X direction, so that the sliding block 334 slides towards the second end 321b in the sliding slot 321.

Figure 13A:
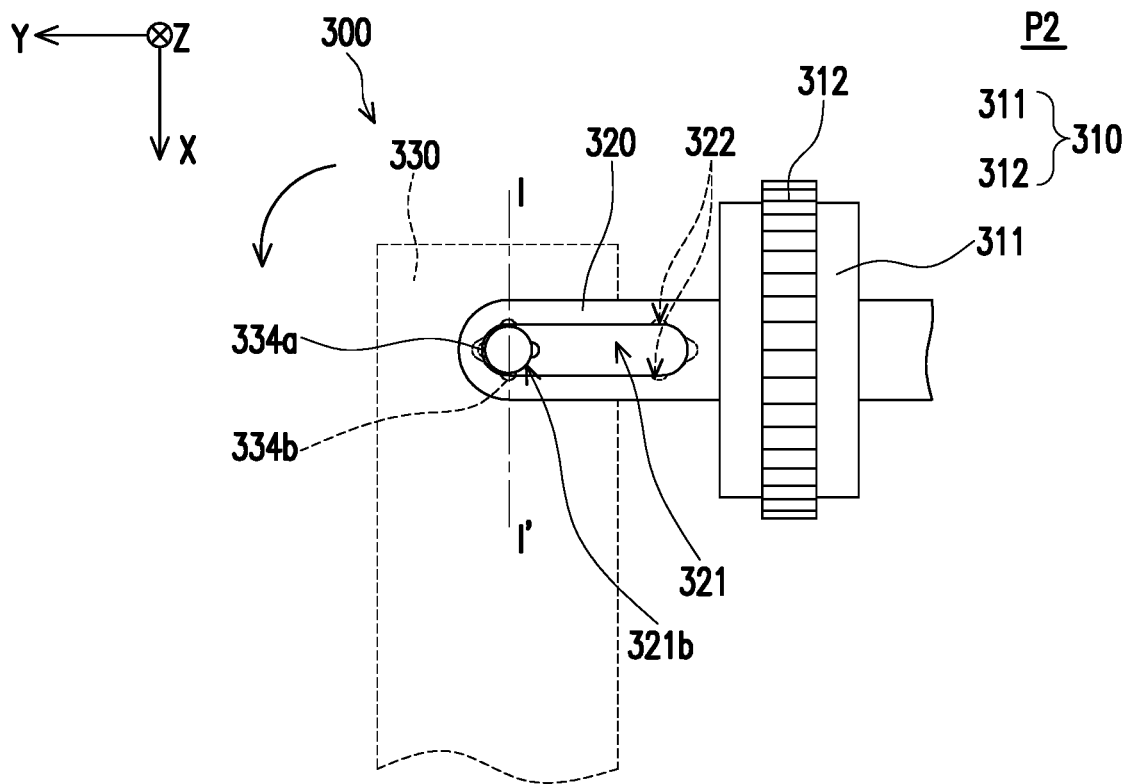
FIG. 13A is a local schematic view of the pen-shaped folding mouse of the third embodiment of the invention at the second position.
Figure 13B:
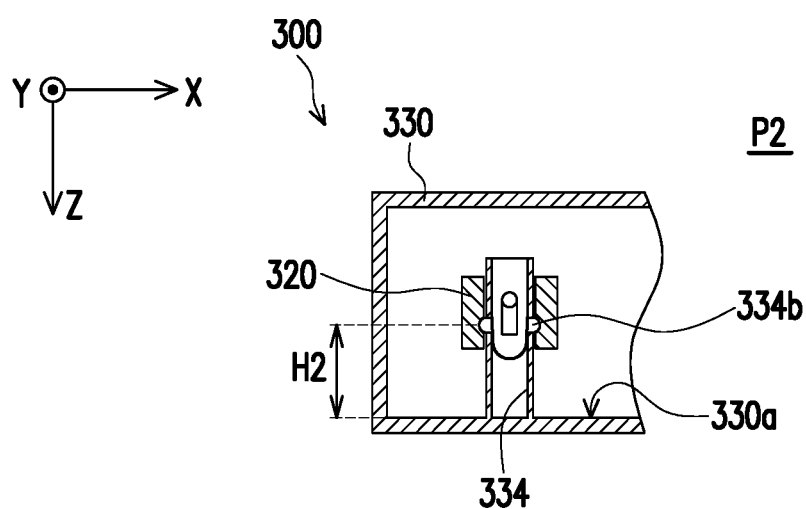
FIG. 13B is a cross-sectional view taken along a line segment I-I' of FIG. 13A.

FIG. 13A is a local schematic view of the pen-shaped folding mouse of the third embodiment of the invention at the second position. FIG. 13B is a cross-sectional view taken along a line segment I-I' of FIG. 13A. With reference to FIG. 13A and FIG. 13B, the viewing angle of FIG. 13A is identical to the viewing angle of 6A. Next, the user may rotate the rod body 330 relative to the scroll wheel 310 by 90 degrees. As shown in FIG. 13A and FIG. 13B, the sliding block 334 may be turned at the second end 321b of the sliding slot 321, so that the two rod bodies 330 are located at the second position P2. At this time, the second positioning portion 334b is matched with the recess shape of the second positioning recess 323, and the pen-shaped folding mouse 300 of this embodiment is secured to the second position P2.

Figure 14:
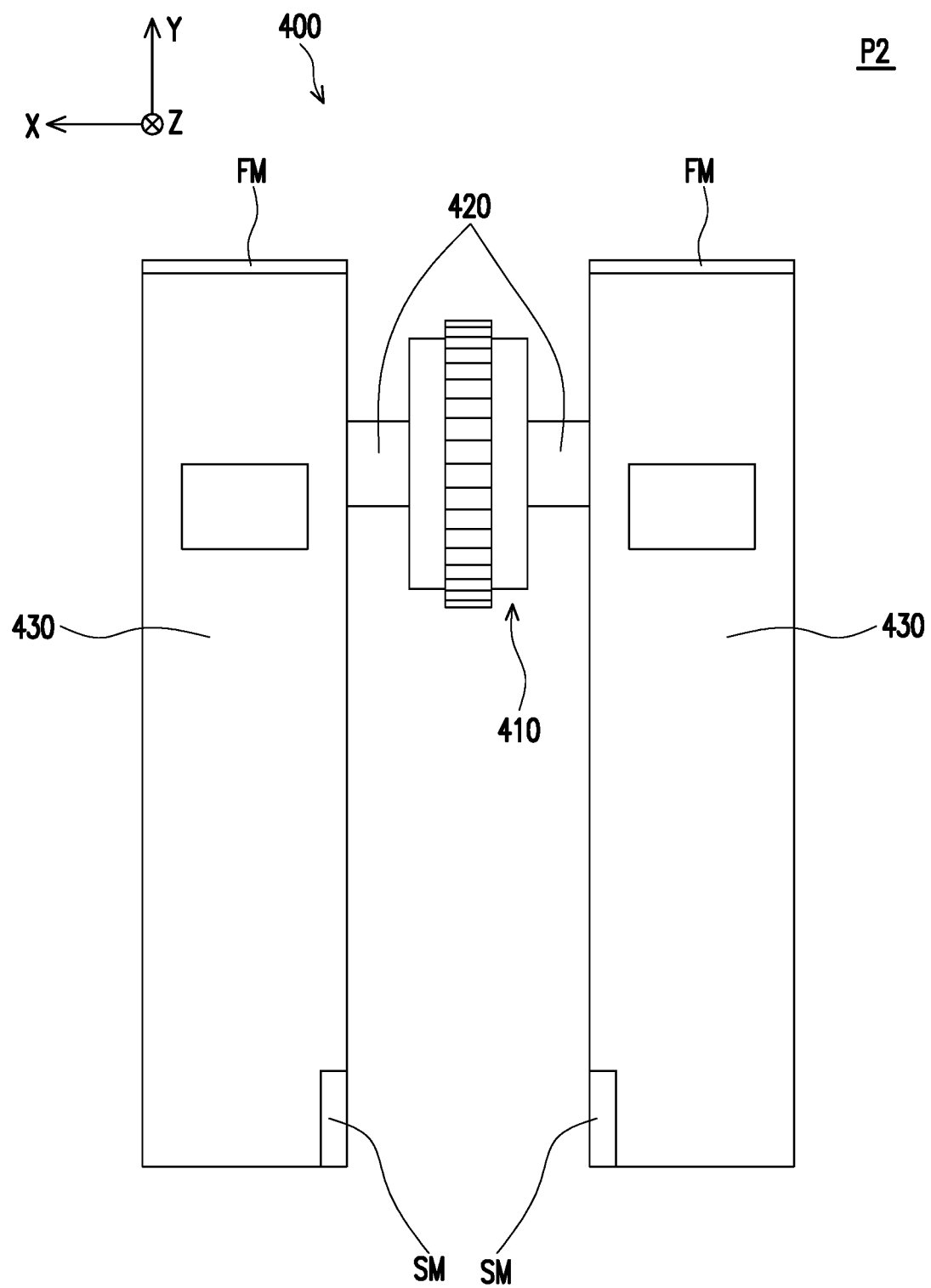
FIG. 14 is a top view of a pen-shaped folding mouse of a fourth embodiment of the invention at the second position.

FIG. 14 is a top view of a pen-shaped folding mouse of a fourth embodiment of the invention at the second position. With reference to FIG. 14, in this embodiment, supporting shafts 420 of a pen-shaped folding mouse 400 may include sliding slots similar to that described in the first embodiment to the third embodiment but may not include any engaging mechanisms. A first magnetic member FM and a second magnetic member SM are disposed on each of two rod bodies 430 instead. Each of the first magnetic members FM and the corresponding second magnetic member SM are located at two opposite end portions of the corresponding rod body 430. When the two rod bodies 430 are at the first position P1 as shown in FIG. 1A, the two first magnetic members FM of the two rod bodies 430 approach a scroll wheel 410 and attract each other, so that the pen shaft shape 10 as shown in FIG. 1A is maintained. When the two rod bodies 430 are at the second position P2, the two second magnetic members SM of the two rod bodies 430 attract each other, so that the shape of the mouse 20 as shown in FIG. 3 is maintained.

Electrical connection between a sensing assembly and a circuit board in a scroll wheel is described as follows.

Figure 15:
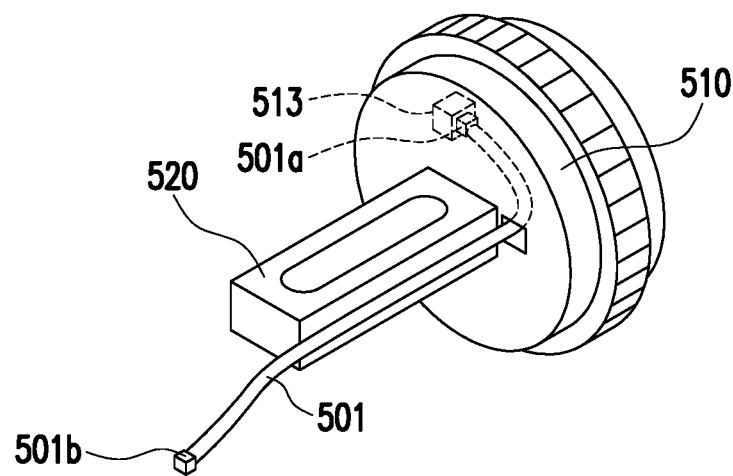
FIG. 15 is a local schematic view of a scroll wheel and supporting shafts of a fifth embodiment of the invention.

FIG. 15 is a local schematic view of a scroll wheel and supporting shafts of a fifth embodiment of the invention. In order to allow the description and illustration to be clearly presented, the following description is provided based on a supporting shaft 520 at one of two opposite sides of a scroll wheel 510. With reference to FIG. 15, in this embodiment, a flexible flat cable 501 is attached onto the supporting shaft 520. Moreover, a first port 501a at one end of the flexible flat cable 501 is inserted into the scroll wheel 510 and is electrically connected to a sensing assembly 513, and a second port 501b at other end of the flexible fat cable 501 may extend into the rod body 130 as shown in FIG. 1A and is connected to the circuit board 170.

The first port 501a of the flexible flat cable 501 inserted into the space of the scroll wheel 510 which may be similar to the receiving space 111a of the first embodiment or the receiving space 211a of the second embodiment. Further, the scroll wheel 510, the supporting shafts 520, and the sensing assembly 513 may be replaced with similar corresponding components in the first embodiment to the fourth embodiment. For instance, the sensing assembly 513 may function as the pressure sensor 213a of the second embodiment. The flexible flat cable 501 is attached to the supporting shaft 220, one end of the flexible flat cable 501 penetrates through the receiving space 211a and is connected to the pressure sensor 213a, and the other end is connected to the circuit board in the rod body 230.

Figure 16:
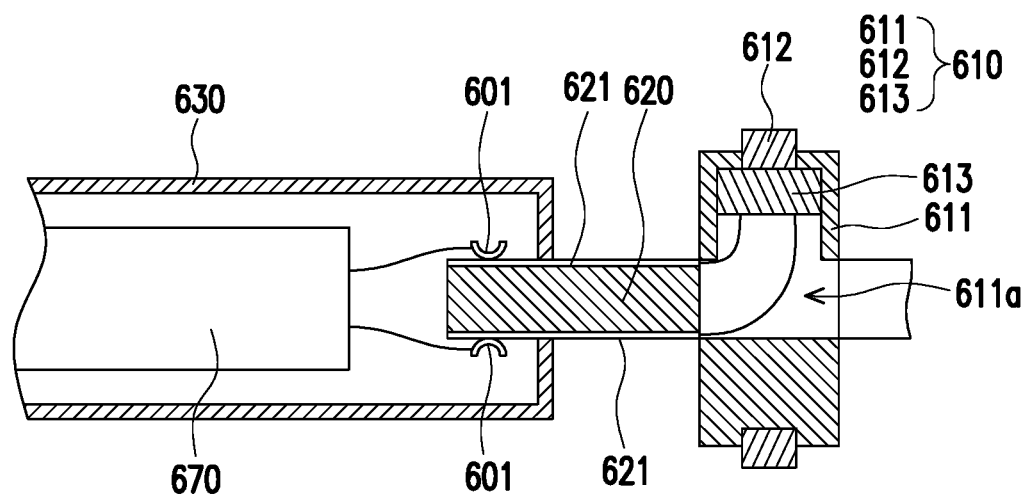
FIG. 16 is a local cross-sectional view of a scroll wheel, a supporting shaft, and a rod body of a sixth embodiment of the invention.

FIG. 16 is a local cross-sectional view of a scroll wheel, a supporting shaft, and a rod body of a sixth embodiment of the invention. In order to allow the description and illustration to be clearly presented, the following description is provided based on a supporting shaft and a rod body at one of two opposite sides of a scroll wheel. With reference to FIG. 16, a rod body 630 further includes two metal sheets 601 located at an inner portion and electrically connected to a circuit board 670 through electric wires. A supporting shaft 620 corresponding to the rod body 630 having the two metal sheets 601 includes two conductors 621 electrically connected to a sensing assembly 613. The two conductors 621 are electrically connected to the sensing assembly 613 in a receiving space 611a of a housing 611 of a scroll wheel 610 through, for example, electric wires. The two metal sheets 601 are in contact with the corresponding two conductors 621, so that the sensing assembly 613 is electrically connected to the circuit board 670. A wheel frame 611 of the scroll wheel 610 and the receiving space 611a thereof, a wheel ring 612, and the sensing assembly 613 may be disposed based on a configuration identical or similar to that of the first embodiment.

In view of the foregoing, the two rod bodies of the pen-shaped folding mouse provided by the invention may be transformed between the first position and the second position to be presented as the pen shaft shape or the mouse shape. Further, when being in the pen shaft shape, the pen-shaped folding mouse features functions different from that when being in the mouse shape. The user thus does not have to carry multiple devices at the same time since multiple functions are integrated. Further, when the user does not have to use the mouse, the user may transform the pen-shaped folding mouse to the pen shaft shape, so the user can carry around the pen-shape folding mouse more conveniently.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A pen-shaped folding mouse, comprising:
   a scroll wheel, having an axis line;
   two supporting shafts, disposed at two opposite sides of the scroll wheel and parallel to the axis line;
   two rod bodies, located at the two opposite sides of the scroll wheel and movably disposed on the two supporting shafts, the two rod bodies comprising two outer surfaces and two first end surfaces adjacent to the scroll wheel;
   two buttons, disposed on the two outer surfaces of the two rod bodies; and
   an optical sensor, located on the outer surface of one of the rod bodies, wherein
   the two first end surfaces face the two opposite sides of the scroll wheel when the two rod bodies are at a first position, the two rod bodies and the scroll wheel extend along the axis line so that a pen shaft shape is presented, the two rod bodies are adapted to move relative to the scroll wheel from the first position to a second position so that the two outer surfaces of the two rod bodies face the two opposite sides of the scroll wheel and approach each other, the two rod bodies, the scroll wheel, the optical sensor, and the two buttons form a mouse together, and the two buttons function as a left button and a right button of the mouse.

2. The pen-shaped folding mouse as claimed in claim 1, wherein each of the rod bodies has a sliding block disposed at an inner portion of each of the rod bodies, each of the supporting shafts has a sliding slot, the sliding block is adapted to slide and rotate in the sliding slot,
   the sliding block is located at a first end in each of the sliding slots when each of the two rod bodies is located at the first position, and
   the sliding block is adapted to be turned after sliding to a second end in each of the sliding slots to secure the two rod bodies to the second position.

3. The pen-shaped folding mouse as claimed in claim 2, wherein each of the rod bodies further comprises a first positioning portion and a second positioning portion, each of the supporting shafts further comprises a first engaging portion,
   the first positioning portion in each of the rod bodies is engaged with the first engaging portion of the corresponding supporting shaft when the two rod bodies are located at the first position, and
   each of the sliding blocks is adapted to be turned after sliding to a second end in each of the sliding slots so that the second positioning portion in each of the rod bodies is engaged with the first engaging portion in the corresponding supporting shaft.

4. The pen-shaped folding mouse as claimed in claim 2, wherein each of the rod bodies further comprises a first positioning portion, each of the supporting shafts further comprises a first engaging portion and a second engaging portion,
   the first positioning portion in each of the rod bodies is engaged with the first engaging portion in the corresponding supporting shaft when the two rod bodies are located at the first position, and
   each of the sliding blocks is adapted to be turned after sliding to a second end in each of the sliding slots so that the first positioning portion in each of the rod bodies is engaged with the second engaging portion in the corresponding supporting shaft.

5. The pen-shaped folding mouse as claimed in claim 2, wherein the sliding block has a first positioning portion and a second positioning portion, the first positioning portion is located on a first height relative to an inner surface of the rod body and extends in a first direction, the second positioning portion is located on a second height relative to the inner surface and extends in a second direction, each of the supporting shafts further comprises a first positioning recess and a second positioning recess connected to the sliding slot and located at different depths, the first positioning recess is close to the first end of the sliding slot and the second positioning recess is close to the second end of the sliding slot,
   each of the sliding blocks is located at the first end in the sliding slot and each of the first positioning portions is engaged with the corresponding first positioning recess when the two rod bodies are located at the first position, and each of the sliding blocks is adapted to be turned after sliding to the second end in the sliding slot so that the second positioning portion in each of the rod bodies is engaged with the corresponding second positioning recess.

6. The pen-shaped folding mouse as claimed in claim 1, wherein the two rod bodies comprise two first magnetic members, each of the first magnetic members is located at an end portion on the corresponding rod body adjacent to the scroll wheel, and the two first magnetic members of the two rod bodies approach the scroll wheel and attract each other so that the pen shaft shape is maintained when the two rod bodies are at the first position.

7. The pen-shaped folding mouse as claimed in claim 6, wherein the two rod bodies further comprise two second magnetic members, each of the second magnetic members is located at an end portion on the corresponding rod body distant from the scroll wheel, and the two second magnetic members of the two rod bodies attract each other so that a shape of the mouse is maintained when the two rod bodies are at the second position.

8. The pen-shaped folding mouse as claimed in claim 1, wherein the scroll wheel comprises a wheel frame, a wheel ring, and a pressure sensor, the two supporting shafts are disposed at two side surfaces of the wheel frame, the wheel ring covers at least a portion of the wheel frame and is movably disposed at the wheel frame, and the pressure sensor is located at an inner side of the wheel ring to sense pressing on the wheel ring.

9. The pen-shaped folding mouse as claimed in claim 8, wherein the scroll wheel comprises a scroll sensor located at the inner side of the wheel ring to sense scrolling of the wheel ring.

10. The pen-shaped folding mouse as claimed in claim 8, wherein one of the rod bodies further comprises a scroll sensor located at the outer surface and close to the scroll wheel, and the scroll sensor is configured to sense scrolling of the wheel ring when the two rod bodies are at the second position.

11. The pen-shaped folding mouse as claimed in claim 8, wherein one of the rod bodies further comprises a circuit board and a flexible flat cable located at an inner portion of the rod body, and the flexible flat cable is attached onto the corresponding supporting shaft and is connected to the circuit board and the pressure sensor.

12. The pen-shaped folding mouse as claimed in claim 8, wherein one of the rod bodies further comprises a circuit board located at an inner portion of the rod body and two metal sheets electrically connected to the circuit board, the supporting shaft corresponding to the rod body comprising the two metal sheets comprises two conductors electrically connected to the pressure sensor, and the two metal sheets are in contact with the corresponding two conductors so that the pressure sensor is electrically connected to the circuit board.

13. The pen-shaped folding mouse as claimed in claim 1, wherein the two rod bodies comprise two protrusions located on the two outer surfaces and adjacent to the scroll wheel, and a distance between a top portion of each of the protrusions and the axis line is greater than a radius of the scroll wheel.

14. The pen-shaped folding mouse as claimed in claim 1, further comprising:
   an infrared ray transmitter, located on a second end surface of one of the rod bodies distant from the scroll wheel.

* * * * *